United States Patent Office 3,345,194
Patented Oct. 3, 1967

3,345,194
ORGANIC AMMONIUM SILICATE COATING COMPOSITIONS
Helmut Hans Wilhelm Weldes, Havertown, and David I. Netting, Swarthmore, Pa., assignors to Philadelphia Quartz Company, Philadelphia, Pa., a corporation of Pennsylvania
No Drawing. Filed Sept. 24, 1963, Ser. No. 311,215
10 Claims. (Cl. 106—287)

This invention generally relates to coating compositions comprising a combination of a bodying agent and certain novel combinations of settable components and setting agents. More particularly the invention pertains to surface coating compositions comprising any one of a variety of bodying agents, a settable component comprising certain organic ammonium silicates and a setting agent.

STATE OF THE ART

The prior art on siliceous coatings is voluminous and such coatings have been used on almost every imaginable surface. Generally, the settable ingredient or component has been an alkali metal silicate solution—but the residual alkali in such solutions has been a problem in developing really good weather-resistant and heat-resistant coatings. The residual alkali forms soluble salts and also acts as a flux at high temperatures. Various additives have been incorporated to tie up the residual alkali so that it will be in insoluble form and resist the fluxing action. One additive which is very widely used is zinc oxide and the reactions of zinc oxide with alkali metal silicates have been studied in considerable detail. Various metal silicofluorides and acid-producing or acidic materials have also been used to partially neutralize the residual alkali metal. In some cases lead oxide has been used to develop a low temperature set for alkali metal silicate-metal pigment systems. By such means valuable coating systems have been worked out for metal surfaces which are subject to very high temperatures and for weather-resistant coatings on metals. Such coating systems have also been used on asbestos-cement siding and for the development of colored coatings on minerals used as roofing granules. All of these applications require a long, useful life under adverse conditions.

In the case of asbestos-cement shingles, the alkali metal silicate solution is mixed with various pigments, fillers and zinc oxide. In these systems the silicate is very often a mixture of sodium and potassium silicate as this permits lower solids content at a given viscosity with a lower softening point in the anhydrous state. Such mixtures are sprayed over the shingles which are then baked at about 500° F., for instance. The thin coating is very hard and quite insoluble but the baking step is expensive and the coating mixture must be used promptly since the zinc oxide reacts with the silicate and forms a gel which has a short working life as a coating composition.

In conclusion, then, there has been a considerable demand for a coating or paint which would set rapidly at room temperature and still be non-flammable and stable indefinitely against weathering; that is, such a coating should have a good bonding strength and water insolubility according ot the tests used in the industry. Similarly, there has been a demand for a coating which will resist high temperatures without melting and running off of the substrate.

OBJECTS

It is, therefore, an object of our invention to produce compositions which result in thin, hard, insoluble coatings. Furthermore, it is an object to produce such coatings which will set at room temperature and be stable indefinitely when exposed to weathering. An additional object is to provide such coatings which are non-flammable and resistant to very high temperatures and, finally, it is our object to provide formulations which will develop smooth, even coats which set without crazing.

THE INVENTION BROADLY

In its broadest aspect the present invention relates to the combination of a bodying component, a settable component and a setting agent.

THE BODYING COMPONENT

The term "bodying component" as used in the present disclosure and claims is intended to encompass pigments, dyes or other coloring materials, fillers and the like. The bodying component primarily functions to give body, strength, color or hardness to the coating composition. The bodying agents are rather insoluble and they do not react with the settable component or the setting agent of the coating composition.

Examples of suitable pigments would be extender pigments such as clays, talc, calcium carbonate, barium sulfate, etc. in order to give the necessary body to the coating. The pigment can also comprise any of the alkali resistant pigments used with soluble alkali metal silicates in order to give color and hiding power. The so-called soap dyes and casein colors are useful as well as phthalocyanines. Unreactive mineral pigments may be used, such as chromium oxide greens, iron oxide reds, alkali resistant ultramarine blues, ochre yellows, umber browns, manganese dioxide or grease-free graphite blacks, etc. To avoid lumps, only carefully screened pigments should be used, and the pigments should be checked by grinding with a portion of the vehicle before use to see whether or not reaction occurs.

The amount of the bodying component can vary a great deal depending upon the use to which the coating composition is to be put, the nature of the substrate, the conditions which are to be encountered, the manner in which the coating composition is applied, the amount of the setting component, the composition of the setting component, etc. In general, the amount of the bodying component can suitably range between 10% and 250% (by weight) of the settable component.

THE SETTABLE COMPONENT

The settable components of the coating compositions of this invention include those organic ammonium silicates which can be characterized by the formula

$$X(N_nR_p{}^s)_2O \cdot YSiO_2 \cdot ZH_2O$$

wherein: N represents a nitrogen atom; $n$ is a small integer less than 10 and preferably less than 5; X, Y and Z represent numbers defining the relative amounts of each of the component parts of the compound. Specifically, X is 1, Y is preferably bewteen 0.5 and 50, and Z is preferably between 0 and 99; R represents alkyl radicals containing between about 1 and 20 carbon atoms, at least one of which is an omega hydroxy alkyl group (preferably one or more of these R groups are ethanol groups and especially preferred are the alkyl ethanol combinations); up to four R groups are associated with each N; $p$ is at least 4, indicating total bonds of R groups to N; and $s$ is an integer from 1 to $p$, indicating the number of different types of R groups.

In a more specific sense, it is believed that the organic ammonium silicate settable components useful in connection with this invention can be characterized by the formula:

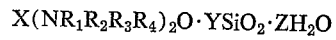

$$X(NR_1R_2R_3R_4)_2O \cdot YSiO_2 \cdot ZH_2O$$

wherein N, X, Y and Z have the significances noted above and $R_1$, $R_2$, $R_3$ and $R_4$ represent alkanol radicals containing between about 1 and 20 carbon atoms.

Preferred specific examples of organic ammonium silicates useful in accordance with this invention would include (a) sodium-free tetraethanolammonium silicate, (b) N, N, N'-tris-($\beta$-hydroxyethyl)-N'-[tris-($\beta$-hydroxyethyl)-ethylammonium]-piperazinium silicate, (c) diethanol morpholinium silicate, (d) hexaethanolethylene diammonium silicate, (e) methyl triethanolammonium silicate, (f) dimethyl diethanolammonium silicate, (g) ethyl triethanolammonium silicate.

All of the organic silicate compounds set forth in copending applications Ser. Nos. 131,490 and 225,111 are useful as settable components in the coating compositions in accordance with this invention.

Preparation of settable component

The settable components of this invention may be prepared in a number of ways. Such methods include, for example:

(a) Removing the alkali metal ion from alkali metal quaternary ammonium silicates by use of a suitable base exchange resin;

(b) Dissolving sodium-free silica in sodium-free hydroxylated alkyl quaternary ammonium hydroxide;

(c) Dissolving sodium-free silica in sodium tetraethanolammonium silicate solutions and removing the alkali metal ion;

(d) The sodium may be leached from the less soluble sodium quaternary ammonium silicate crystals;

(e) Reacting ammonia or its derivatives and ethylene oxide with finely divided silica hydrate or silica gel, or a colloidal silica sol.

Specific and detailed methods of preparing settable components useful in accordance with this invention are set forth in copending applications, Ser. Nos. 131,490 and 225,111.

Concentration and $SiO_2$ content of settable component

Aqueous solutions of our settable component may be prepared with mol ratios of silica to organic alkali oxide as high as 50, or even greater, and containing 50% or more of $SiO_2$, whereas even concentrated commercial silica sols generally contain only 30% $SiO_2$. The upper limit of concentration depends on the consistency of the final mixture desired and, when modified, by the limits at which precipitation or gelation may occur.

Influence of pH on settable components

Our settable components may be used either at an acid or an alkaline pH, but in general the alkaline solutions prepared according to our hereinafter specified methods are preferred.

We have found that a water solution of an alkali metal-free ammonium silicate, such as tetraethanolammonium silicate, with a concentration of about 40% $SiO_2$ and a ratio of 18.6 $SiO_2$ to 1 quaternary oxide, which may have a pH of about 10.8, may be "prepolymerized." In this case the pH may be reduced to about 9.6 by the addition of sufficient mineral acid to reduce the pH by 1.20 units. On aging overnight or warming for a short period, the pH will again rise to about 10.42 and a further reduction of 0.13 pH unit produces a solution having a final and nearly constant pH of about 10.29. If this sequential addition of increments of acid is not carried out, an initial reduction to a pH of about 9.6 will result in a solution having a final pH of about 10.4 when the solution is used. This higher pH accounts for the soft bond in the final settable component. If, on the other hand, the pH of the initial water solution is reduced by 1.2 pH units, as indicated above, aged for several hours, and then reduced further by 0.13 pH unit, the pH will remain nearly constant. If desired, the pH may be reduced silghtly by a further addition of acid. Such solutions remain stable in pH and provide excellent mold binders for investment casting. With setting agents, they also may produce excellent water-resistant ceramic coatings, such as those used for roofing granules.

With varying ratios of $SiO_2$ to quaternary oxide the first incremental pH change varies about as follows. With a ratio of 5.6 the first incremental change should be about 0.9 pH unit. At a ratio of 10.8 the first incremental change should be about 1.4 units. As stated above, at a ratio of about 18.6 the incremental change should be 1.2 units, and at a ratio of 30 it should again be about 0.9 unit. Thus the preferred initial pH change passes through a maximum. At the low ratios it is controlled by the high salt content, while at the high ratios it is controlled by the silica content.

The more alkaline ratios have initially a much higher initial pH as shown in the following table:

| Ratio $SiO_2$/quaternary oxide | Percent $SiO_2$ | pH |
|---|---|---|
| 1.06 | 30.0 | 13.1 |
| 2.60 | 30.0 | 13.3 |
| 5.40 | 35.8 | 12.2 |
|      | 31.5 | 11.8 |
| 9.6  | 46.9 | 11.5 |
|      | 41.0 | 11.4 |
| 18.6 | 44.2 | 11.1 |
| 25.2 | 44.2 | 10.8 |
| 30.0 | 36.4 | 10.0 |

Compatibility of settable component with solvents

The organic silicate settable components of this invention are compatible with many water miscible organic solvents. A comparison of the compatibility of a silica sol (Ludox HS, from E. I. du Pont de Nemours & Co.) and high ratio tetraethanolammonium silicate with various organic solvents is set forth in the table below:

MAXIMUM AMOUNT OF SOLVENT IN MIXTURES STABLE FROM 1° C. TO 60° C. (PERCENT)

|  | High Ratio TEA Silicate | | | Ludox HS | |
|---|---|---|---|---|---|
|  | 50% $SiO_2$ | 30% $SiO_2$ | 15% $SiO_2$ | 30% $SiO_2$ | 15% $SiO_2$ |
| Methanol | 37.5 | 50.0 | 61.5 | 37.5 | -------- |
| Ethanol | 28.6 | 44.5 | 54.5 | 16.7 | 37.5 |
| Iso-propanol | 23.1 | 37.5 | 54.5 | 16.7 | 16.7 |
| Acetone | 23.1 | 37.5 | 44.5 | 16.7 | 37.5 |
| Dioxan | 16.7 | 28.6 | 28.6 | 16.7 | 61.5 |
| Tetrahydrofuran | 16.7 | 37.5 | 44.5 | 16.7 | 28.6 |

THE SETTING AGENTS

Setting agents are added to the settable components to cause the settable components to solidify and become insoluble in water. The better setting agents also increase the adhesion to the substrate. Acids may be used as setting agents, or compounds which undergo chemical change to give an acid solution. (These are also effective in preparing the prepolymerized settable components mentioned above.) Setting agents which have been particularly effective are boric and phosphoric acid, silicofluorides, lead oxides such as litharge, lead carbonate, magnesium carbonate and zinc carbonate. If the setting agents is so soluble that it reacts with the organic silicate and forms a gel before the coating is prepared and applied to the substrate, there will be no binding action and the coating will be easily removed from the surface. If, on the other hand, the added setting agent does not react at all with the organic silicate, the coating will be easily removed by rubbing after boiling in water. Of course, if there is no requirement for resistance to weathering, there is no need to add a setting agent. Compounds such as calcium hydroxide, barium acetate, magnesium phosphate, calcium sulfate and lead sulfate all react so readily that the coating gels during preparation. Other compounds appear to be so insoluble or unreactive that the coating is not insolublized against the boiling test. Such compounds are cobaltic oxide, cupric oxide, calcium carbonate, zinc sulfide, calcium phosphate, magnesium oxide, ferrous sulfide, etc.

There is also an upper limit on the amount of lead oxide which may be added without gelling. In the cases tested with 24.5 $SiO_2$/tetraethanolammonium oxide settable agent, mixtures containing 25% or less of lead oxide did not gel in 3 months whereas mixtures with 36% of lead oxide gelled on ball milling. As a guide to skilled coating formulators, we note that the optimum concentration varies with the ratio silica/organic oxide as shown in the following table. The second column shows the maximum amount of lead oxide which will not cause gelation in three months, and in the third column is the minimum amount which caused gelation during mixing in the ball mill:

| Ratio | Stable (max.) | Gel (min.) |
| --- | --- | --- |
| 9.30 | 12.5 | 18.75 |
| 18.64 | 25.0 | 31.25 |
| 45.00 | 6.25 | 12.5 |

LOADING

Cracking of the coating applied to a substrate depends not only on the type of subtrate but also on the amount of setting agent added and the amount and type of loading agent as well as the ratio and concentration of the silicate binder. For instance, at a silica to organic oxide ratio of 24.5 with 400 mesh talc the concentrations of the organic silicate and lead oxide can be much higher before cracking occurs than they can be when kaolin coating clay of about the same size range is used as the loading agent. With talc, cracking begins at a concentration of about 12.5% lead oxide based on the soluble $SiO_2$ of our substituted (i.e. quaternary) ammonium silicates present when there is 40 grams of such $SiO_2$ per 100 ml. of total solution. If only 20 grams of such $SiO_2$ per 100 ml. is present, then 25% lead oxide can be added before cracking occurs. The amount of loading also depends on the concentration of the silica. At 40 grams of soluble $SiO_2$ per 100 ml. and 12.5% PbO the highest amount of loading that could be added and yet form a coating which could not be rubbed loose was 125%. At 150% loading, the pigment could be rubbed loose after boiling. At 20 grams of soluble $SiO_2$ per 100 ml. the pigment rubbed loose at 125% loading after boiling, and it also rubbed loose even without boiling at a loading of above 150%. A loading as low as 25% with 40 grams of $SiO_2$/100 ml. was used and formed a shiny coating except for a few cracks in grooves where the coating was thicker. The best loading appeared to be about 90 to 100% at this concentration of soluble silica and ratio of the binder.

The useful loading ratio also depends on the method of application. When the coatings were sprayed on with a spray gun instead of being brushed on, a 60% loading was a little smoother than a 120% loading in a binder solution containing 25 g. soluble $SiO_2$/100 ml. of solution and 25% PbO, and both looked better than the brushed coatings. At 40 grams of soluble $SiO_2$/100 ml. and 12.5% PbO a loading of 75% was smoother than one of 125%. In these tests the pigment was ferric oxide and the extender pigment was talc.

*Advantages of the new binder component over those now in use*

The binder components of this invention offer important advantages over those binder components (such as soluble alkali metal silicates, organic silicate esters and silica sols) which are now being used by those in the art. The most striking advantages can be summarized as follows:

(a) Alkaline binder solutions in accordance with this invention are delivered ready to use. No pH or concentration adjustments are necessary.

(b) Our ready-to-use binder solutions are indefinitely stable. They are not affected by freezing or heating to temperatures up to about 150° F. if stored in closed containers. If heated to a sufficiently high temperature, our binder components leave a residual bond of only $SiO_2$.

(c) They need not contain organic solvents, so there may be no fire or vapor hazards.

(d) Slurries of particulate materials prepared with our novel binder components are indefinitely stable if agitated properly and kept closed when not in use.

(e) They are substantially free of alkali metal ions which form water soluble salts and are fluxing agents at higher temperatures.

(f) They are readily set by reaction with liquid or gaseous acids or acidic compounds.

The tetraethanolammonium silicates and their derivaties are stable water-free compositions which are easily soluble in water. These compositions have a range of mole ratio of $SiO_2$ to quaternary oxide from about 0.5 to 1.0 or lower, to about 50 to 1 or higher. These pure compositions vary from viscous oily liquids at the lower ratios to pliable solids in the higher range and, finally, to brittle solids. At a silica to oxide ratio of about 40, the dehydrated solid becomes insoluble. These compositions below about ratio 30 are miscible in all proportions with water. The silica is present in aqueous solution of such compositions largely as crystalloidal silica under equilibrium conditions. The solutions have a relatively high pH but a viscosity much lower than that of a sodium silicate solution having a similar solids content and silica to alkali oxide ratio. Soluble alkali metal silicate solutions above a molecular ratio of 4.0 of $SiO_2$ to alkali metal oxide are so difficult and costly to manufacture and so relatively unstable at high concentrations that they have never been commercially available. Thus in the sodium system a ratio of 4.0 has been considered the maximum. As pointed out above, this 4.0 ratio material can be concentrated usefully only to about 30% solids whereas the 24 $SiO_2$ to organic ammonium oxide ratio will readily form solutions of reasonable viscosity at more than 60% solids content.

Films formed from these solutions of organic alkali silicates are not water-tight. That is, although they are not broken down by water, they are wet by water and will pass water through. Such coatings are quite satisfactory for use on asbestos-cement siding or other building materials. They allow the shingle to breathe. They will resist rubbing. On metal panels, the inclusion of zinc dust pigment helps to prevent corrosion on exposure to weather.

The condition of the substrate also may be important. Adhesion to old, rusted metal is much easier than adhesion to a coated surface even though it is fairly clean beforehand. Old, rusty, Bunsen burner chimneys coated with these tetraethanol-ammonium silicate mixtures formulated as in the examples below were resistant to rubbing and showed no signs of failure or change in color after more than three months use, often at red heat.

Coatings on a metal plate and on an asbestos-cement shingle were placed directly over the hottest part of a blast burner (about 1100° C.) whereupon the metal and the asbestos-cement both turned red from the heat. After 2 minutes exposure, the metal panel and the shingle were cooled to room temperature. Some pigments did change color but iron oxide returned to its original color and the coating looked the same after heating as before.

Simple evaporation of water causes the films to solidify but except at high ratios of silica to organic alkali ions they will redissolve. If heated to high enough temperatures, the organic alkali decomposes leaving an insoluble residual bond of silica.

UTILITY

The compositions of this invention, as well as solutions thereof are useful as adhesives, cold welding agents, or cements, and will find application in molded products and coatings. As used in this application, the expression "composition" or "novel composition" primarily includes compositions such as enamels, paints, refractory films, molded products and cements. Coatings include the primary investment coating for wax patterns as well as enamels, including cold enamels and overglazes, paints both for ordinary and high temperature use, other refractory films, corrosion-resistant films, heat conductive and electrically resistant films, coatings on shingles or board for roofing, siding, venting, partitioning or other building purposes, especially where the substrate is asbestos-cement, gypsum or other commonly used material, hardening and weatherproofing treatments for stone, sealing for metals such as anodized aluminum, fountain solutions for planograph printing, sizing of threads as well as fabric finishing and tanning operations. Thus our novel composition and binder components may be used generally where its properties are advantageous.

EXAMPLES IN GENERAL

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

In testing the adherence of coatings in the following examples the coated substrate was boiled in distilled water for 15 minutes and then dried for 24 hours. The coating was checked by rubbing with the finger to find out how easily the pigment could be loosened both before and after drying. Coatings of lower soluble quaternary ammonium silicate concentrations rubbed loose slightly easier than ones with higher soluble silicate concentrations, and the pigment concentration had very little effect on the strength of the coating. Neither did heat treatment. In general, prepolymerized binders did not adhere tightly by this test. The triple pH adjusted prepolymerized binder was somewhat more tightly bound than the double pH adjusted binder. Tetraethanolammonium silicates having higher ratios of silica to alkali ion, such as 24, formed coatings which were more difficult to rub loose.

Coatings prepared from solutions in which a setting agent was used without prepolymerization were most resistant to rubbing while still wet.

Another more stringent test was to place the coated sample, such as a coated asbestos-cement shingle, in an autoclave with a small amount of water, after which the pressure was raised to 150 p.s.i. by heating to 180° C. in a closed autoclave. The steam was then released and after cooling the shingles were examined for fading of the color. Coatings made with our compositions were unchanged after this whereas commercial coatings were faded and lighter in color.

Samples of the film itself scraped from metal substrate were also boiled for 15 minutes and a colormetric determination (described by Vail in chapter 2, vol. I of "Soluble Silicates") made of the $SiO_2$ dissolved. The amount of $SiO_2$ dissolved from our coatings was always below 2% of the silica present in the substituted quaternary ammonium silicate and the quaternary oxide dissolved was usually below 0.5%. Lead oxide as a setting agent without pH adjustment to the solution permitted slightly more silica, 3.75%, and, more 0.82%, of the quaternary oxide. However, this latter binder is stronger and the pigments cannot be rubbed loose after boiling. The solubility of the solids is much below the maximum (5%) desired by the industry.

EXAMPLE 1

A solution of tetraethanolammonium silicate containing 49.06% $SiO_2$ and a mole ratio of 18.6 $SiO_2$ to 1 quaternary oxide was diluted to a concentration of 30 grams $SiO_2$ per 100 ml. and adjusted by reducing the pH 1.2 units, allowing the solution to age overnight, again adjusting the pH by lowering it 0.25 unit, and finally adjusting by lowering another .04 unit after standing for 4 hours. This solution was then diluted so that the grams of $SiO_2$ per 100 ml. varied from 15 to 6 grams of $SiO_2$ per 100 ml., and then loaded with pigment $Fe_2O_3$ at a rate which varied from 180 to 0% of silicate solids while simultaneously increasing the loading with Barden clay from 0 to 180% of the silicate solids in the binder solution (the total amount of pigment and clay always amounting to 180%). It was found that with 15 grams of $SiO_2$ per 100 ml. concentration in the binder no clay was needed to obtain a film which was smooth and uniform and could not be rubbed off after drying for 24 hours at room temperature. At lower concentrations of $SiO_2$, even down to 6 grams per 100 ml., smooth films which could not be rubbed off were obtained if ⅙ of the pigment was replaced by clay. These coatings on asbestos-cement shingles were boiled in 50 ml. of water for 15 minutes. All become somewhat soft and dull and could be rubbed off after drying, even though less than 1% of the quaternary ion present and less than 5% of the $SiO_2$ was dissolved during this loading test. None of the coatings came off of the shingle specimens during the boiling.

A further series of tests with a binder which had only undergone a double pH adjustment was made with the silica concentration varying from 9 to 25 grams of $SiO_2$ per 100 ml. and with the pigment-clay loading varying from 240 to 90% of the silica solids. Below a pigment-clay loading of 120%, where the ratio of pigment to clay was 1 to 1, and at lower silica concentrations at all loadings, smooth uniform coatings were obtained which did not rub off at a silica concentration of above 12 grams of silica per 100 ml. but chipped off above 20 grams of silica per 100 ml. In this case, the best coatings, that is the coatings which were smooth and uniform and did not rub off, were obtained at a binder solution strength of 15 grams of $SiO_2$ per 100 ml. and a loading of 180% or less. However, these coatings also became softer after boiling in water for 15 minutes and redrying overnight.

EXAMPLE 2

A number of tests were made using a doubly pH adjusted quaternary tetraethanolammonium silicate having a ratio of 24.5 $SiO_2$ to 1 quaternary oxide and a concentration of 30 grams of $SiO_2$ per 100 ml. of water using a 1:1 ratio of $Fe_2O_3$ to Barden clay at loadings varying from 90 to 180% and silica concentrations varying from 9 to 15 grams of silica per 100 ml. Smooth coatings were obtained which could not be broken off even after drying at room temperature. Drying at 200° C. did not increase the resistance to rubbing. In all cases, after boiling for 15 minutes and air-drying for 24 hours the pigment could be rubbed off with difficulty. If the dry shingle is dipped in dilute acid, the pigment becomes more difficult to rub off even after boiling.

With other coatings in which clay alone was used as the loading and an organic dye was used as the pigment it was not possible to rub off the coating even after the boiling test.

EXAMPLE 3

In this example a series of inorganic pigments were used, with a 1:1 ratio of pigment to Barden clay. In this case a doubly pH adjusted 24.5 oxide ratio tetraethanolamonium silicate at a concentration of 15 grams $SiO_2$ per 100 ml. was used. The loading was 180%. In no case could the coating be rubbed off before boiling and in all cases the coating withstood heating over a blast burner for 5 minutes.

With chromium oxide as the pigment, the tetraethanolammonium silicate solution was adjusted in pH using zinc silicofluoride, magnesium silicofluoride and sulfuric acid in a series of preparations. While the coating could not be rubbed off before boiling, it could be rubbed off very easily after boiling and drying for 24 hours. With cuprous oxide as the pigment, and the pH adjusted with zinc silicofluoride, the coating could be rubbed off with considerable diffculty after boiling and redrying, but where sulfuric acid was used for pH adjustment the coating could be rubbed off rather easily.

With ferric oxide as the pigment and zinc silicofluoride for pH adjustment, the coating could not be rubbed off after boiling and redrying. However, with sulfuric acid for pH adjustment, the coating could be rubbed off with difficulty after boiling and redrying.

With lead dioxide as the pigment, and with either a double adjustment with 1% zinc silicofluoride, or a double adjustment first with zinc silicofluoride and then with magnesium silicofluoride, the coating could not be rubbed off after boiling and redrying. However, with a single pH adjustment using 2% zinc silicofluoride to a final pH of 9.91, the coating could be rubbed off after boiling and redrying but with difficulty: similarly, when sulfuric acid was used for pH adjustment.

EXAMPLE 4

A coating with 180% loading of clay and ferric oxide in a 1:1 ratio was made using tetraethanolammonium silicate having a ratio of 45.0 $SiO_2$ to 1 quaternary oxide at a 38% silica concentration with no pH adjustment. A good coating, without cracks, formed which could be rubbed off when air-dried 24 hours, but when boiled for 15 minutes and redryed it could be easily rubbed loose. Somewhat similarly the use of boric acid for a double pH adjustment with 24.5 oxide ratio silicate provided a very good coating with clay and ferric oxide pigment but, again, it could be rubbed off after boiling and redrying.

EXAMPLE 5

Using a 24.5 oxide ratio tetraethanolammonium silicate at a concentration of 40 grams of $SiO_2$ per 100 ml. a coating was made by ball milling 3.74 grams of clay and 3.74 grams of ferric oxide and 1 gram of lead oxide with 20 ml. of the silicate solution. The coatings were applied to the shingles after ball milling for 1 hour and allowed to dry over the weekend, although 1 hour drying gives the same result. These coatings could not be rubbed off even after boiling for 6 hours without drying. The appearance of the coating was unchanged by the boiling. It was found that only 0.82% of quaternary ion was dissolved from the coating and 3.75% of $SiO_2$. This test was carried out by removing some of the film and boiling it in water and testing the filtrate.

Cracking of the coating is dependent on the percentage of lead oxide, percentage and type of loading and concentration of silicate. When 400 mesh talc is used as the extender pigment instead of clay, the silicate and lead oxide concentrations can be much higher before cracking occurs. Cracking begins at 12.5% lead oxide based on the $SiO_2$ present when the concentration is 40 grams of $SiO_2$ per 100 ml. When the concentration is 20 grams of $SiO_2$ per 100 ml. as much as 25% lead oxide can be added before cracking occurs.

There is also a limit to the amount of loading that can be added to the coating mixture. The amount used for most tests was 94% based on the silica present. This percentage covered the shingle well and looked good. At a concentration of 40 grams of $SiO_2$ per 100 ml. and 12.5% lead oxide, the highest amount of loading that could be added was 125%. At 150% loading, the pigment could be rubbed loose after boiling. Even if more setting agent was added, the pigment still could be rubbed loose after boiling. This shows that there is not enough binder to hold the pigment. At 20 grams of $SiO_2$ per 100 ml. the pigment rubs loose at 125% loading after boiling, and the pigment even rubs loose without boiling above 150% loading. As low as 25% loading was tried at 40 grams of $SiO_2$ per 100 ml. concentration. This coating was shiny and looked well except for a few cracks in the grooves of the shingle. The best loading appears to be around 90 to 100%.

Several coating mixtures were prepared and sprayed on shingles using a small spray gun. Two different mixtures were made at an $SiO_2$ concentration of 25 grams of $SiO_2$ per 100 ml. and a lead oxide concentration of 25% of the $SiO_2$ present. One mixture had a loading of 120% and the other a loading of 60%. The coating of 60% loading was a little smoother than the one at 120% but both looked very good. There were no cracks and the coatings had a better appearance than the brushed coatings. Two different coating mixtures were made at a silica concentration of 40 grams of $SiO_2$ per 100 ml. and lead oxide concentration of 12.5% of the $SiO_2$ percent. One mixture had a loading of 125% and the other a loading of 75%. Here, again, the lower loading was a little smoother than the coating with the higher loading but both looked excellent. The pigment used was ferric oxide and the extender pigment was talc, and the oxide ratio of the silicate was 24.5 in this series of tests.

EXAMPLE 6

Morpholinium silicate was used in a coating mixture instead of the tetraethanolammonium silicate in order to demonstrate that any of the tetraalkanolammonium silicates may be used in accordance with this invention. The concentration of the silicate was 40 grams of $SiO_2$ per 100 ml. and the ratio was 20.0 $SiO_2$ to 1 quaternary oxide. Lead oxide was used as the setting agent in amounts from 0.5 to 2.0 grams of lead oxide. The mixture contained 3.5 grams of iron oxide pigment, 3.5 grams of talc, 20 ml. of the morpholinium silicate plus the setting agent. The coatings all looked good and appeared the same as the tetraethanolammonium silicate coatings. After boiling and while the shingles were still wet, the coatings with 1.0 grams of PbO or more could not be rubbed off. None of the mixtures gelled and in general the morpholinium silicate appears to give the same coatings as the tetraethanolammonium silicate.

EXAMPLE 7

A series of tests using tetraethanolammonium silicates of different ratios were carried out with 20 ml. of the silicate solution at a concentration of 40 grams of $SiO_2$ per 100 ml. The loading was 3.5 grams of iron oxide and 3.5 grams of talc and the lead oxide setting agent was varied from 0.5 to 2.0 grams. With a tetraethanolammonium silicate ratio of 9.30 $SiO_2$ to 1 quaternary oxide, the best amount of setting agent was 0.5 gram. The coating rubbed off of asbestos-cement only very slightly after boiling. At the ratio of 18.64, any coating containing more than 1.0 gram of lead oxide was satisfactory but the coating with 2.0 grams was the best. At a ratio of 44, concentrations of lead oxide of 1.0 gram or more all gelled in the ball mill, but at 0.5 gram the coating rubbed off only slightly after boiling.

With a colloidal silica, LUDOX HS, the lead oxide content was varied from 0 to 2.0 grams of PbO. At the higher concentration of lead oxide, the mixture gelled on the ball mill whereas at the lower concentrations no satisfactory coating could be formed.

In another series of tests, different setting agents were tried but the loading was with 3.5 grams of iron oxide, 3.5 grams of talc all with 20 ml. of the tetraethanolammonium silicate having an oxide ratio of 24.10 and a concentration of 40 grams $SiO_2$ per 100 ml. The setting agent concentration was varied from 0.5 gram to 2.0 gram and each mixture was ball milled 3 hours before the coating was applied to an asbestos cement shingle. After drying overnight, the coatings were boiled for 15 minutes and the coating was then rubbed while still wet. Lead oxide was the best setting agent but lead carbonate was fairly good at higher concentrations. Those salts used as setting agents which were too soluble caused gelling in the ball mill. Where the setting agent did not cause gelling and was not soluble enough to react when the coating was dried out, the pigment could be rubbed off easily. Thus lead oxide with the solubility in cold water of 0.0068 gram per 100 cc. formed coatings which could not be rubbed off in the range of 1.0 gram to 2.0 grams or higher. With lead carbonate having a solubility of 0.0011 gram per 100 cc. the coating was better as the concentration of the setting agent increased until at 2 grams the coating could only be rubbed off slightly after boiling. With magnesium carbonate having a solubility of 0.04 gram per 100 cc. the coating containing 1.5 grams rubbed off only slightly after boiling and did not rub off at all at 2.0 grams content. Zinc carbonate having a solubility of 0.01 gram per 100 cc. rubbed off only slightly after boiling at 2.0 grams concentration.

Alkyl triethanolammonium silicates such as monoethyl or monomethyl triethanolammonium silicates form coatings with the setting agents of this invention which bond even more strongly to glass and metal than the tetraethanolammonium silicates. These lower alkyl triethanolammonium silicate binders form exceptionally hard, weather-resistant, stable coatings on metal and other adherends. When formulated with metallic zinc pigments the coatings on metal are also corrosion resistant.

It is, therefore, evident from the foregoing examples and discussion that alkali metal-free amine silicates, of which tetraethanolammonium silicate is the most readily available example, formed very efficient binders for coatings on various inorganic, organic and metal surfaces. They will air-set to form quite insoluble coatings within 10 minutes and can be pigmented in various ways and treated to decrease their solubility in water and increase their adhesion to the surface so that such coatings can resist boiling in water for as much as 6 hours or more. These coatings also can be formulated to withstand temperatures above red heat without deterioration either in the strength of the coating or its appearance. We have demonstrated a number and variety of examples of these coatings. These examples will suggest equivalent formulations to those who are acquainted with the art and we do not wish to be strictly bound by the limitations of our examples.

What is claimed is:
1. A coating composition consisting essentially of
 (a) a bodying component such as pigments, dyes, coloring materials or fillers,
 (b) a settable component,
 (c) said settable component consisting essential of a compound having the formula:

$$X(N_nR_p{}^s)_2O \cdot YSiO_2 \cdot ZH_2O$$

wherein: N represents a nitrogen atom; $n$ is a small integer less than 10 and preferably less than 5; X, Y and Z represent numbers defining the relative amounts of each of the component parts of the compound, and X is 1, Y is preferably between 0.5 and 50, and Z is preferably between 0 and 99; R represents alkyl radicals containing between about 1 and 20 carbon atoms, at least one of which is an omega hydroxy alkyl group; $p$ is at least 4, indicating bonds of total R groups to N; and $s$ is an integer from 1 to $p$, indicating the number of different R groups, and
 (d) between about 6% and 36% by weight of a setting agent selected from the group consisting of boric acid, phosphoric acid, lead oxides, lead carbonate, magnesium carbonate, zinc carbonate and silicofluorides,
 (e) said bodying component being substantially insoluble and non-reactive with both the said setting agent and said settable component.

2. A composition according to claim 1 wherein the bodying agent is selected from the group consisting of clay, talc, calcium carbonate, barium sulfate, alkali resistant pigments, soap dye, casein color, phthalocyanines, chromium oxide greens, iron oxide reds, alkali resistant ultramarine blues, ochre yellows, umber browns, manganese dioxide, and graphite blacks.

3. A composition according to claim 1 wherein the amount of the bodying component ranges between about 10 to 250 weight percent.

4. A composition according to claim 2 wherein the amount of the bodying component ranges between about 10 and 250 weight percent.

5. A composition according to claim 4 wherein the setting agent is lead oxide.

6. A composition according to claim 4 wherein the setting agent is lead carbonate.

7. A composition according to claim 4 wherein the settable component is a sodium-free tetraethanolammonium silicate.

8. A composition according to claim 7 wherein the setting agent is lead oxide.

9. A composition according to claim 4 wherein the settable component has been prepolymerized.

10. A composition according to claim 4 wherein the settable component is an alkyl ethanolammonium silicate.

References Cited

UNITED STATES PATENTS

| | | | |
|---|---|---|---|
| 3,131,148 | 4/1964 | Tauili | 106—287 |
| 3,208,961 | 9/1965 | Kookootsedes | 260—37 |
| 3,239,521 | 3/1966 | Weldes | 260—448.2 |
| 3,248,237 | 4/1966 | Weldes et al. | 106—38.35 |

MORRIS LIEBMAN, *Primary Examiner.*

ALLAN LIEBERMAN, *Assistant Examiner.*